(No Model.) 2 Sheets—Sheet 1.

J. B. HEVERLING.
STAVE DRESSING MACHINE.

No. 314,125. Patented Mar. 17, 1885.

Attest:
Charles Pickles
Geo. L. Wheelock

Inventor:
Jno. B. Heverling
By Knight Bros
Attys (No Model.) 2 Sheets—Sheet 2.

J. B HEVERLING.
STAVE DRESSING MACHINE.

No. 314,125. Patented Mar. 17, 1885.

Attest:
Charles Pickles
Geo. L. Wheelock

Inventor:
Jno. B. Heverling
By Knight Bros
Attys.

UNITED STATES PATENT OFFICE.

JOHN B. HEVERLING, OF ST. LOUIS, MO., ASSIGNOR, BY MESNE ASSIGNMENTS, TO THE CINCINNATI COOPERAGE COMPANY, OF CINCINNATI, OHIO.

STAVE-DRESSING MACHINE.

SPECIFICATION forming part of Letters Patent No. 314,125, dated March 17, 1885.

Application filed June 25, 1884. (No model.)

*To all whom it may concern:*

Be it known that I, JOHN B. HEVERLING, of the city of St. Louis, in the State of Missouri, have invented a certain new and useful Improvement in Stave-Dressing Machines, of which the following is a full, clear, and exact description, reference being had to the accompanying drawings, forming part of this specification, and in which—

Figure 1:
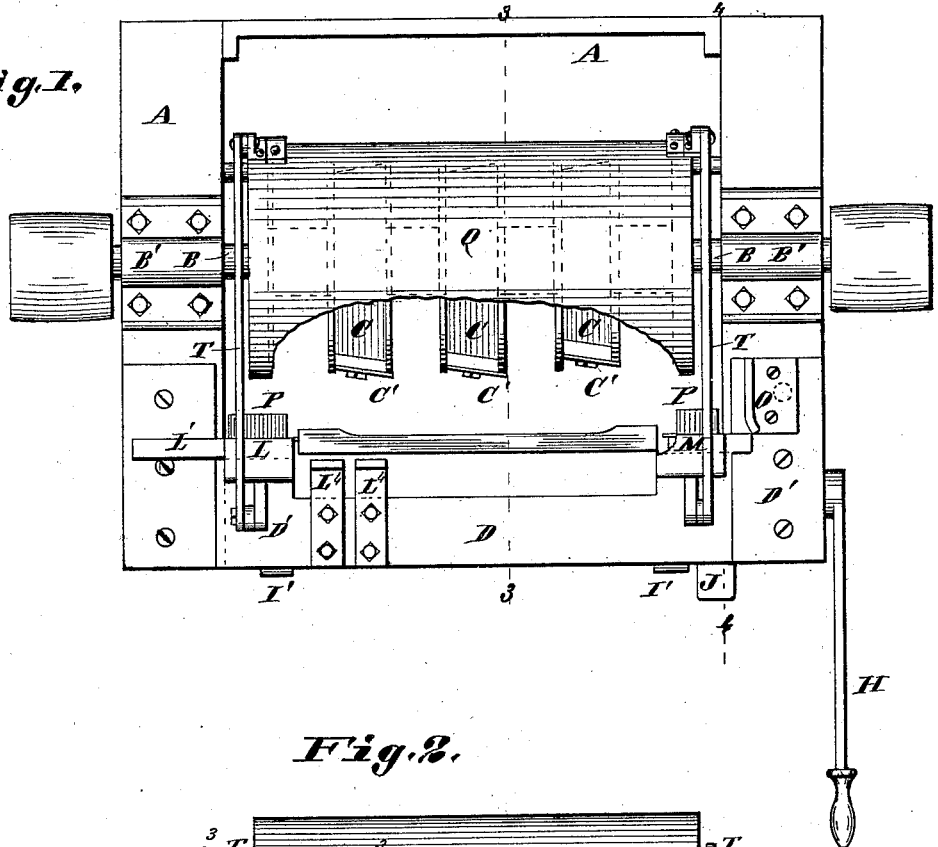
Figure 2:
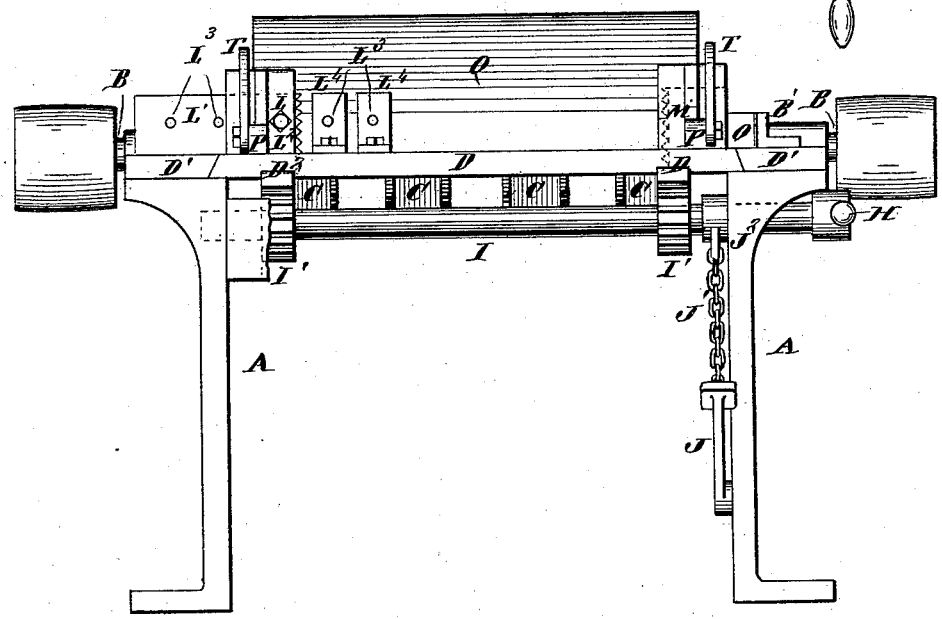
Figure 3:
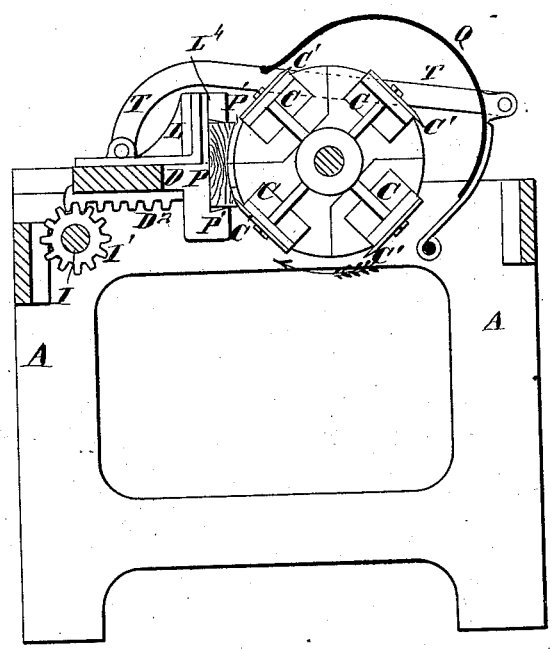
Figure 4:
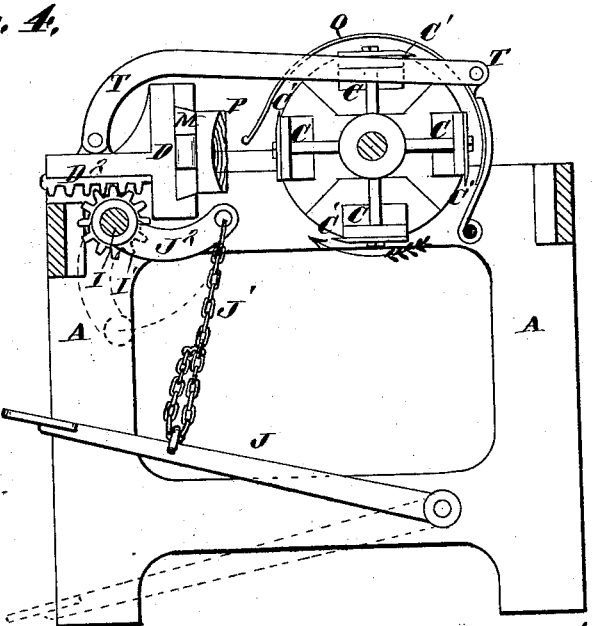

Figure 1 is a top view, part of the shield being broken away. Fig. 2 is a front view. Fig. 3 is a vertical transverse section taken on line 3 3, Fig. 1; and Fig. 4 is a similar view taken on line 4 4, Fig. 1.

This invention relates to a machine for dressing the interior surface of the stave, and is intended to be used in connection with another machine, for which application for Letters Patent is filed herewith, and which is designed to dress the exterior surface of the stave.

This invention consists in features of novelty hereinafter fully described, and pointed out in the claims.

Referring to the drawings, A represents the frame of the machine.

B represents a shaft journaled in boxes B', secured to the frame, and to which are secured heads C, provided with cutters or knives C'. The shaft is turned by any suitable power in the direction shown by the arrows in Figs. 3 and 4.

D represents a sliding frame held upon the frame A by plates D', and moved to and from the cutters by means of a hand-lever, H, secured to a rock-shaft, I, supported by the frame. The shaft has pinions I' meshing into racks D² on the underside of the frame D. As the shaft is rocked by the lever the frame D is moved toward and from the cutters. A treadle, J, connected, by means of a chain, J', to a crank, J², secured to the rock-shaft, may be used to assist the lever in moving the frame forward. The frame is provided with fixed dogs L at one end and sliding dogs M at the other end, between which the stave N is clamped, the moving dog being forced toward the stationary dog to clamp the stave by means of a cam, O, secured to the frame A, with which it is brought in contact when the frame D is moved forward. When the stave has been dressed, the frame is moved back and the stave released by the backward movement of the dog M. The stationary dog is made adjustable by being secured to a plate, L', made fast to the frame A by means of a bolt, L², which fits in any one of a series of holes, L³, and when the dog is moved forward until its front end is past the plate it may be further supported by one or more plates, L⁴, secured to the frame A, and having upturned ends over which the dog is moved. This dog can be thus moved toward or from the other, being made fast when adjusted to receive staves of different lengths. To each dog is secured a block, P, having a concave face, as shown in Figs. 3 and 4, the concavity being the same or about the same as that given to the staves by the cutters. These blocks act as guides or gages to set the stave-blanks by the forward or front surface of the blank being brought flush with the outer edges, P', of the blocks.

To avoid danger of the person placing the stave-blanks between the dogs being hurt by the cutters, I hinge a shield, Q, to the frame A back of the cutters, which extends up over the cutters and down in front of them. It is connected by means of arms T with the sliding frame D, so that as the frame is moved forward it (the shield) is automatically raised into the position shown in Fig. 3, to permit the stave-blank to be brought against the cutters, and then, as the frame is moved back, the shield is brought down in front of the cutters again.

I claim as my invention—

1. In a stave dressing machine, the combination of a suitable bed or frame, revolving cutter-heads journaled to said frame, a frame to carry the staves toward or from the cutter-heads, a rack secured to the stave-frame, and a shaft journaled in the bed, and having a lever by which it is rocked and a pinion to engage the rack to advance and retract the stave-frame.

2. In a stave dressing machine, the combination of a suitable bed or frame, revolving cutter-heads journaled to said frame, a stave-frame to slide toward and from the cutter-heads, and dogs secured to the stave-frame and having gage-blocks.

3. In a stave-dressing machine, the combination of a suitable bed or frame, revolving cutter-heads journaled to said frame, a sliding stave-frame, a shield for the cutter-heads hinged to the bed, and an arm hinged to the stave-frame and shield, the latter being raised and lowered by the advance and retraction of the stave-frame.

JOHN B. HEVERLING.

In presence of—
GEO. H. KNIGHT,
BENJN. A. KNIGHT.